(12) United States Patent
Mohaghegh

(10) Patent No.: US 10,417,561 B2
(45) Date of Patent: Sep. 17, 2019

(54) DATA-DRIVEN ANALYTICS, PREDICTIVE MODELING AND OPTIMIZATION OF HYDRAULIC FRACTURING IN SHALE

(71) Applicant: INTELLIGENT SOLUTIONS, INC., Morgantown, WV (US)

(72) Inventor: Shahab D. Mohaghegh, Morgantown, WV (US)

(73) Assignee: INTELLIGENT SOLUTIONS, INC., Morgantown, WV (US)

( * ) Notice: Subject to any disclaimer, the term of this patent is extended or adjusted under 35 U.S.C. 154(b) by 859 days.

(21) Appl. No.: 14/777,153

(22) PCT Filed: Mar. 17, 2014

(86) PCT No.: PCT/US2014/030873
§ 371 (c)(1),
(2) Date: Sep. 15, 2015

(87) PCT Pub. No.: WO2014/146004
PCT Pub. Date: Sep. 18, 2014

(65) Prior Publication Data
US 2016/0042272 A1   Feb. 11, 2016

(51) Int. Cl.
*G06N 5/04*   (2006.01)
*G06N 3/08*   (2006.01)
(Continued)

(52) U.S. Cl.
CPC ............ *G06N 3/08* (2013.01); *E21B 43/267* (2013.01); *E21B 43/30* (2013.01); *G06N 3/0472* (2013.01); *G06N 5/04* (2013.01)

(58) Field of Classification Search
None
See application file for complete search history.

(56) References Cited

PUBLICATIONS

Badru, Well—Placement Optimization Using the Quality Map Approach, Masters Thesis, 2003, pp. 1-62.*

(Continued)

*Primary Examiner* — Wilbert L Starks
(74) *Attorney, Agent, or Firm* — Carter, DeLuca & Farrell LLP

(57) ABSTRACT

A computer system, comprising: one or more processors; and a memory coupled to the one or more processors, wherein the computer system is programmed with a set of computer-readable instructions configured to implement a method for determining a drill site in a shale, tight gas sands, coal bed methane or other unconventional well field for an oil or gas well and one or more parameter settings therefore, the computer-readable instructions comprising: one or more data mining instructions for data mining of a first part of a set of measurement or objective data parameters from existing oil or gas wells in the well field that, when executed, produce a ranking of each parameter and its respective effect on oil or gas well production from the well field; one or more training instructions that, when executed, produce a model comprising an artificial neural network (ANN) trained with the first part of the set of measurement or objective data parameters and/or the ranking that is useful for producing a group of optimized settings for one or more of the parameters for an estimated maximum output from one or more locations in the well field; and one or more calibration and/or validation instructions that, when executed, calibrate and/or validate the model using a second part of the set of measurement or objective data parameters from existing oil or gas wells in the well field.

20 Claims, 15 Drawing Sheets

Wells of different quality based on 180 days cumulative rich gas production.

(51) Int. Cl.
*E21B 43/267* (2006.01)
*E21B 43/30* (2006.01)
*G06N 3/04* (2006.01)

(56) References Cited

PUBLICATIONS

Arain, et al., Nonlinear System Identification Using Neural Network, IMTIC 2012, CCIS 281, 2012, pp. 122-131.*
Smith, A Tutorial on Principal Components Analysis, University of Otago, New Zealand, 2002, pp. 1-27.*
Badru, Well—Placement Optimization Using the Quality Map Approach, Masters Thesis, 2003, pp. 1-62 (Year: 2003).*
Form PCT/ISA/220, PCT Notification of Transmittal of the International Search Report and the Written Opinion of the International Search Authority, or the Declaration, PCT/US2014/030873, dated May 6, 2015.
Form PCT/ISA/210, PCT International Search Report for International Application No. PCT/US2014/030873, dated May 6, 2015.
Form PCT/ISA/237, PCT Written Opinion of the International Searching Authority for International Application No. PCT/US2014/030873, dated May 6, 2015.
Form PCT/IB/326, PCT Notification Concerning Transmittal of International Preliminary Report on Patentability for International Application No. PCT/US2014/030873, dated Sep. 24, 2015.
Form PCT/IB/373, PCT International Preliminary Report on Patentability for International Application No. PCT/US2014/030873, dated Sep. 15, 2015.
S. Esmaili et al, Forecasting, Sensitivity and Economic analysis of Hydrocarbon Production from Shale Plays Using Artificial Intelligence & Data Mining, SPE Canadian Unconventional Resources Conference, Calgary, Alberta, Paper 162700, Jan. 1, 2012, pp. 1-9.
S. Akin et al, Optimization of well placement geothermal reservoirs using artificial intelligence, Computers and Geosciences, Pergamon Press, Oxford, GB, vol. 36, No. 6, Jun. 1, 2010, pp. 776-785.
A. Centilmen et al, Application of neural Networks in Multiwell Field Development, 1999 SPE Annual Technical Conference and Exhibition, Houston, Texas, Paper 56433, Oct. 3, 1999, pp. 1-11.
Ahmed Ouenes, Practical application of fuzzy logic and neural networks to fractured reservoir characterization, Computers & Geosciences, vol. 26, No. 8, Oct. 1, 2000, pp. 953-962.
Maqsood Ali et al, Using artificial intelligence to predict permeability from petrographic data, Computers & Geosciences, vol. 26, Jan. 1, 2000, pp. 915-925.
C. Oberwinkler et al, The Definitive Identification of Candidate Wells for Refracturing, SPE Annual Technical Conference and Exhibition, Denver, Colorado, Paper 84211, Oct. 5, 2003, pp. 1-17.
Shahab Mohaghegh et al, Design optimum frac jobs using virtual intelligence techniques, Computers & Geosciences, vol. 2, No. 8, Oct. 1, 2000, pp. 927-939.
Bob Shelley et al, The use of artificial neural networks in completion stimulation and design, Computers & Geosciences, vol. 26, Jan. 1, 2000, pp. 941-951.
A. Al-Anazi et al, Automatic fracture density update using smart well data and artificial neural networks, Computers & Geosciences, Pergamon Press, Oxford, GB, vol. 36, No. 3, Mar. 1, 2010, pp. 335-347.
Shahab Mohaghegh et al, Intelligent Systems Can Design Optimum Fracturing Jobs, 1999 SPE Easter Regional Meeting, Charleston, WV, Paper 57433, Oct. 21, 1999, pp. 1-9.
S. Mohaghegh et al, Identifying Best Practices in Hydraulic Fracturing Using Virtual Intelligence Techniques, 2001 SPE Eastern Regional Meeting, Canton, OH, Paper 72385, Jan. 1, 2001, pp. 1-11.
S. Zargari et al, Field Development Strategies for Bakken Shale Formation, SPE Eastern Regional Meeting, Morgantown, WV, Paper 139032-PP, Jan. 1, 2010, pp. 1-18.
Shahab Mohaghegh, Reservoir simulation and modeling based on artificial intelligence and data mining (AI&DM), Journal of Natural Gas Science and Engineering, Elsevier, Amsterdam, NL, vo. 3, No. 6, Aug. 21, 2011, pp. 697-705.

* cited by examiner

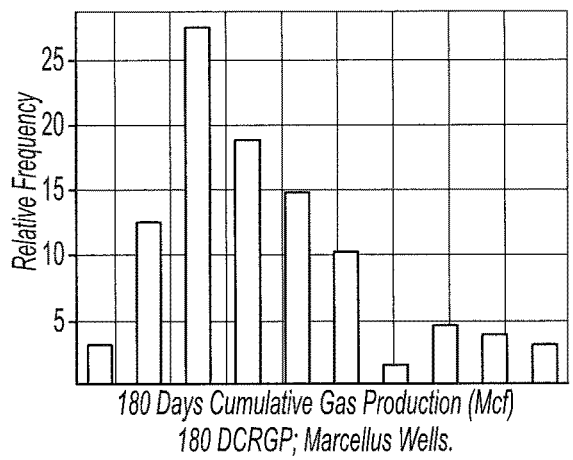

180 DCRGP; Marcellus Wells.

FIG. 1

| Well Name<br>Easting End Point<br>Northing End Point<br>MD (End)<br>TVD (End)<br>Azimuth (End)<br>Inclination (End)<br>Deviation-DownDip<br>Deviation-UpDip<br>Deviation-NoDip | Well Location and Details |
|---|---|
| Upper Marcellus -Porosity %<br>Upper Marcellus -Permeability (md)<br>Upper Marcellus -Gross Thickness(ft)<br>Upper Marcellus -NTG<br>Upper Marcellus -Water Saturation(%)<br>Upper Marcellus -TOC %<br>Lower Marcellus -Porosity%<br>Lower Marcellus -Permeability (md)<br>Lower Marcellus -Gross Thickness(ft)<br>Lower Marcellus -NTG<br>Lower Marcellus -Water Saturation(%)<br>Lower Marcellus -TOC %<br>Marcellus-Porosity%<br>Marcellus-Permeability (md)<br>Marcellus-Gross Thickness(ft)<br>Marcellus-NTG<br>Marcellus-Water Saturation(%)<br>Marcellus-TOC %<br>Marcellus-Average Langmuir Volume (scf/ton)<br>Marcellus-Average Langmuir Pressure(psi) | Static-Marcellus |

*Well and reservoir characteristics avaliable in the dataset.*

FIG. 2

| | |
|---|---|
| Comp-Perforated Lateral (ft)<br>Comp-Stimulated Lateral Length (ft)<br>Comp-Clusters per Stage<br>Comp-Shot Density (shots/ft) | Completion |
| Stim-Average Injection Pressure per well(psi)<br>Stim-Average Injection Rate Per well(bbl/min)<br>Stim-total clean volume per well (bbl)<br>Stim-total Slurry volume per well (bbl)<br>Stim-Maximum propant Concentration per well(lb/gal)<br>Stim-Total Proppantper stage(lb)<br>Stim-Total Proppant pumped (lb)<br>Stim-Number of Stages<br>Stim-Formation 1 Middle Hamilton<br>Stim-Formation 2 Lower 20ft Hamilton<br>Stim-Formation 3 Upper M<br>Stim-Formation 4 Purcell<br>Stim-Formation 5 Upper MA<br>Stim-Formation6 Middle MA<br>Stim-Formation 7 Lower MA | Stimulation |
| Prod-30 Day Cum Gas (MCF)<br>Prod-30 Day Cum Condensate (bbls)<br>Prod-90 Day Cum Gas (MCF)<br>Prod-90 Day Cum Condensate (bbls)<br>Prod-120 Day Cum Gas (MCF)<br>Prod-120 Day Cum Condensate (bbls)<br>Prod-180 Day Cum Gas (MCF)<br>Prod-180 Day Cum Condensate (bbls) | Production |

*Completion, Stimulation and Production characteristics available in the dataset.*

FIG. 3

Correlation between well inclination and 30 days cumulative rich gas production.

Application of Fuzzy Pattern Recognition to Easting End Point and Total Injected Proppant.

Tornado chart displaying the KPI.

KPI analysis for parameters associated with the well location

KPI analysis for reservoir parameters

Wells of different quality based on 180 days cumulative rich gas production.

Well Quality Analysis of Lower Marcellus Gross Thickness and Average Treatment Pressure.

BTU Area
Easting End Point
Northing End Point
Measured Depth (ft)
Azimuth
Inclination
Marcellus Porosity (%)
Marcellus Net Thickness (ft)
Marcellus Water Saturation (%)
Marcellus TOC (%)
Marcellus Volume Constant (scf/ton)
Marcellus Pressure Constant (psi)
Stimulated Lateral Length (ft)
Lateral Length/Stage (ft)
Clusters/Stage
Shot Density (shot/ft)
Average Treatment Pressure (psi)
Average Treatment Rate (bbls/min)
Total Clean Volume (bbls)
Total Slurry Volume (bbls)
Max. Proppant Concentration (lbs/gal)
Proppant/Stage (lbs)

*Input parameters used in the predictive model.*

FIG. 11

Total Proppant/Stage type curves as a function of the length of stimulated lateral.

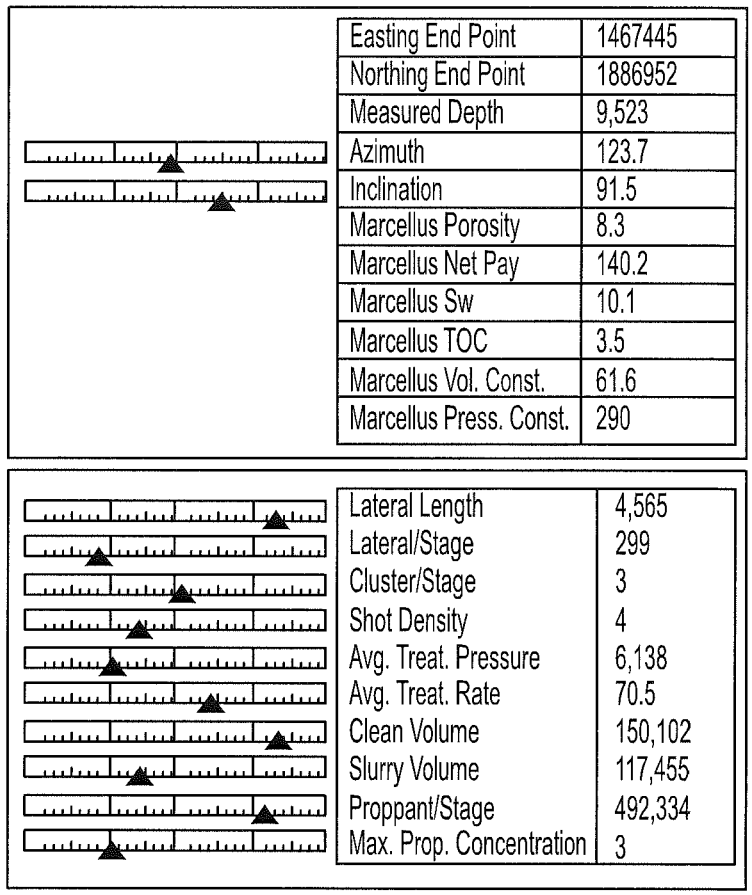
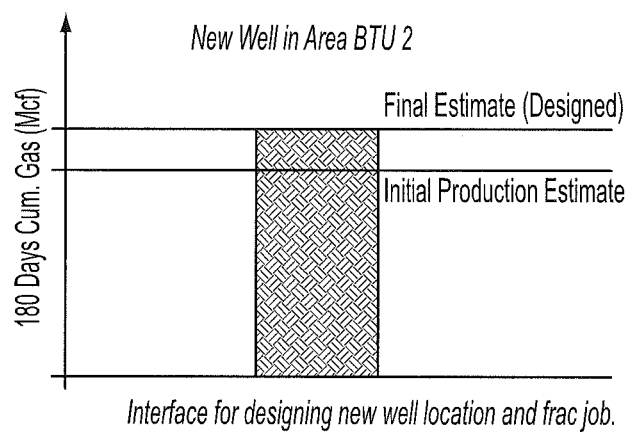
Interface for designing new well location and frac job.
FIG. 16

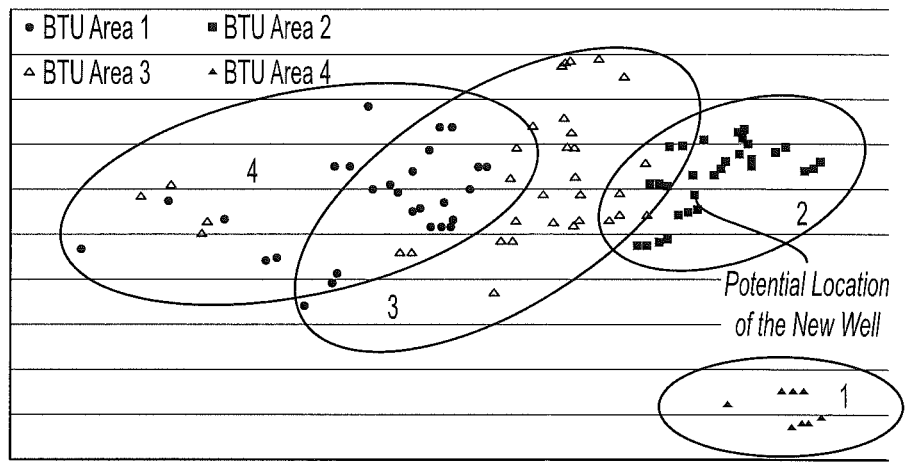
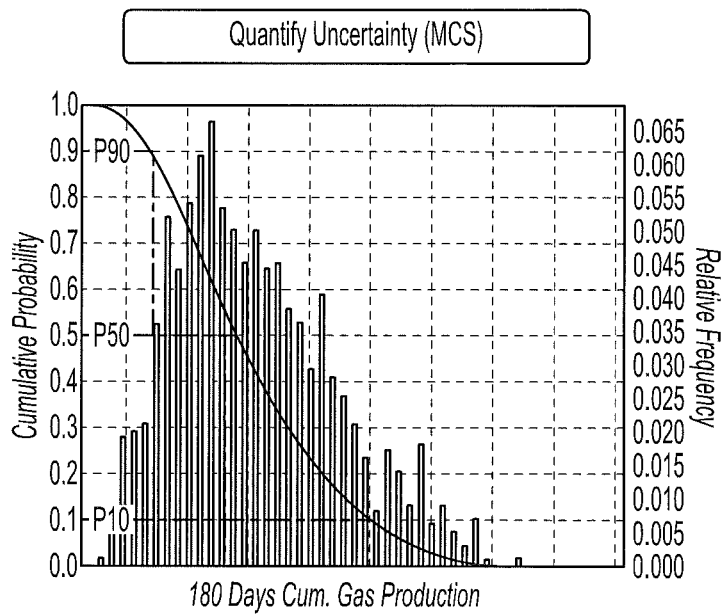
Identification of new well location and design
of completion and Stimulation for the new well.
FIG. 17

*The smart applications that are the result of advanced data mining and predictive data-driven analytics are fast with small computation foot-print and can be deployed on tablet computers.*

DATA-DRIVEN ANALYTICS, PREDICTIVE MODELING AND OPTIMIZATION OF HYDRAULIC FRACTURING IN SHALE

CROSS REFERENCE TO RELATED APPLICATIONS

This application claims priority to, and the benefit of, the U.S. provisional patent application U.S. Patent Application Ser. No. 61/790,982 filed on Mar. 15, 2013, which is hereby incorporated by reference in its entirety for all purposes.

TECHNICAL FIELD

The present invention relates generally to systems and methods for determining a drill site in a shale, tight gas sands, coal bed methane or other unconventional well field for an oil or gas well and one or more parameter settings therefore.

BACKGROUND

Hydraulic fracturing in shale wells can and should be optimized. A "One Size Fits All" approach to design and implementation of hydraulic fracturing jobs in shale and other unconventional wells fails to take full advantage of their production potentials.

Hydraulic fracturing in Marcellus Shale—Shale reservoirs are characterized by extremely low permeability rock that has a number of unique attributes, including high organic content, high clay content, extremely fine grain size, plate-like microporosity, and little to no macroporosity, all coupled with Darcy and Fickian flow through the rock matrix.

This combination of traits has led to the evolution of hydraulic fracture stimulation involving high rates, low-viscosities, and large volumes of proppant. The stimulation design for plays such as Marcellus Shale is drastically different than anything else that has been performed in the past.

The common practice in Marcellus shale is pumping water, sand and other additives under high pressure into the formation to create massive fractures. The slurry is approximately 99% water and sand, along with a small amount of special-purpose additives. The newly created fractures are "propped" open by the sand, which allows the natural gas to flow into the wellbore and be collected at the surface".

OILFIELD DATA MINING—Data mining is the process of extracting hidden patterns from data. As more data is gathered in the oilfield, data mining is becoming an increasingly important tool to transform this data into information and knowledge that can be used effectively during the decision making process.

It is becoming more and more evident that operators can create strategic advantages over their competitors by making use of data mining to get important insights from the data they collect.

Hard Data Vs. Soft Data

"Hard Data" refers to the field measurements and other objective information. This is the data that can readily be, and usually is, measured during the operation. As far as hydraulic fracturing is concerned, variables such as fluid type and amount, proppant type and amount, proppant concentration, injection and breakdown pressure, injection rates and ISIP are considered to be "Hard Data". For hydraulic fracturing in shale assets, "Hard Data" are measured and recorded in details and are available.

In the context of hydraulic fracturing of shale wells, "Soft Data" refers to variables that are interpreted, estimated or guessed. Parameters such as hydraulic fracture half length, height, width and conductivity cannot be directly measured. Even when hydraulic fracturing modeling software applications are used to estimate these parameters, the gross limiting and simplifying assumptions that are made, such as well-behaved penny like double wing fractures, renders their utilization in design and optimization irrelevant.

Another variable that is commonly used in modeling of hydraulic fractures in shale is Stimulated Reservoir Volume (SRV). SRV is also "Soft Data" since its value cannot be directly measured. SRV is mainly used as a set of tweaking parameters (along with SRV-Permeability gradients) to help reservoir modelers in the history matching process.

Due to its interpretive nature, "Soft Data" cannot be used as an optimization variable. In other words, one cannot expect to design a particular hydraulic fracturing job that results in a well behaved induced fracture with a designed half length, height and conductivity by tweaking the amount of fluid and proppant that is injected. Similarly, designing SRV (size and permeability) by modifying the amount of fluid and proppant that is injected during a hydraulic fracturing job or the injection rate and pressure is not an option. Therefore, although "Soft Data" may help engineers and modelers during the history matching process, it fails to provide means for truly analyzing the impact of what actually is done during a frac job.

Thus, it would be desirable to use historical "Hard Data" to optimize hydraulic fracturing operations in shale assets.

It would be desirable to provide a system and method for determining the site for a shale or other unconventional well and one or more optimization parameters for such site. It would also be desirable to provide such optimization as the last of a three-step process that begins with Data-Driven Analytics and Predictive Modeling. The optimization parameters may include optimum lateral length, amount of proppant injected in each stage, and length of each stage, among other parameters, optimum pad location, number of laterals in a pad, Best trajectory, Design of a multi-stage frac jobs (lateral length proppant and fluid amount to be injected, pressure and injection rates, number of stages, stage length), etc.), estimates of gas and condensate production (taking into account uncertainties associated with all reservoir, completion & stimulation parameters, etc.).

It is demonstrated under the present disclosure that the complexity of this problem requires an integrated analytics approach that engages interdependency between reservoir characteristics and well configurations with hydraulic fracturing parameters in the optimization process. Therefore, one should not expect a "One Size Fits All" result from this or any other serious analysis.

Numerical modeling of coupled "reservoir" and "completion behavior of Marcellus Shale wells" has proven to be a challenging task with results that leave much to be desired. Data driven modeling is a viable alternative for gaining maximum insight from the field experience and developing predictive capabilities. The present disclosure demonstrates that data-driven modeling and data mining provide valuable insight into hydraulic fracturing practices in the Marcellus Shale.

Using "180 Days of Cumulative Rich Gas Production" as the target production indicator, the present disclosure demonstrates how the following can be accomplished for a new well in a Marcellus Shale asset:

SUMMARY

In a preferred aspect, the present disclosure comprises a computer system, comprising: one or more processors; and a memory coupled to the one or more processors, wherein the computer system is programmed with a set of computer-readable instructions configured to implement a method for determining a drill site in a shale, tight gas sands, coal bed methane or other unconventional well field for an oil or gas well and one or more parameter settings therefore, the computer-readable instructions comprising: one or more data mining instructions for data mining of a first part of a set of measurement or objective data parameters from existing oil or gas wells in the well field that, when executed, produce a ranking of each parameter and its respective effect on oil or gas well production from the well field; one or more training instructions that, when executed, produce a model comprising an artificial neural network (ANN) trained with the first part of the set of measurement or objective data parameters and/or the ranking that is useful for producing a group of optimized settings for one or more of the parameters for an estimated maximum output from one or more locations in the well field; and one or more calibration and/or validation instructions that, when executed, calibrate and/or validate the model using a second part of the set of measurement or objective data parameters from existing oil or gas wells in the well field.

In another preferred aspect, the computer system may further comprise: one or more optimization instructions that, when executed, use the model to produce, for each of the one or more locations in the well field, a setting for each of one or more parameters that will provide an estimated maximum output.

In yet another preferred aspect, the computer system may further comprise: one or more inverse problem solving instructions that, when executed, use the model to produce optimized settings for each of the one or more parameters for each location to produce a predicted maximum output therefrom.

In another preferred aspect, the computer system may further comprise: one or more uncertainty analysis instructions that, when executed, use a probability distribution function for each of the parameters associated with the one or more locations and the model to produce a probability distribution function of output from each the one or more locations.

In yet another preferred aspect, the computer system may further comprise: one or more selection instructions that, when executed, use the optimized parameter settings and the probability distribution function of output for each of the one or more locations in the well field to select the drill site and one or more parameter settings therefore.

In another preferred aspect of the computer system, the one or more parameter settings for the drill site includes one or more items from the group consisting of: optimum pad location, number of laterals in a pad, best trajectory, design of a multi-stage hydraulic fracturing jobs including lateral length, proppant and fluid amount to be injected, pressure and injection rates, number of stages, stage length, distance between stages of hydraulic fracturing, distance between laterals in a pad or between pads, distance between stages of hydraulic fracturing, and hydraulic fracturing design optimization.

In another preferred aspect of the computer system, the set of measurement or objective data parameters from existing oil or gas wells in the well field is selected from the group consisting of: location of other wells; fluid type and amount; proppant type and amount; proppant concentration; injection and breakdown pressure; injection rates; instantaneous shut-in pressure (ISIP); hydraulic half length; hydraulic half height; hydraulic half width; hydraulic conductivity; porosity (%); permeability (md) gross thickness (ft); total organic content (%); water saturation (%); 30, 90, 120 and/or 180 day gas (DCRGP) and condensate production totals represented as (Mcf/D) and (bbls/D), respectively; and stimulated reservoir volume (SRV).

In yet another preferred aspect of the computer system, the first part of set of measurement or objective data parameters comprises about 80%.

In another preferred aspect of the computer system, the one or more data mining instructions comprises one or more fuzzy pattern recognition instructions.

In a further preferred aspect of the computer system, the one or more uncertainty analysis instructions comprises one or more Monte Carlo Simulation instructions.

In another preferred aspect, the present disclosure comprises a computer-implemented method for determining a drill site in a shale, tight gas sands, coal bed methane or other unconventional well field for an oil or gas well and one or more parameter settings therefore, at least a portion of the method being performed by a computing device comprising at least one processor, the method comprising: data mining of a first part of a set of measurement or objective data parameters from existing oil or gas wells in the well field to produce a ranking of each parameter and its respective effect on oil or gas well production from the well field; producing a model comprising an artificial neural network (ANN) trained with the first part of the set of measurement or objective data parameters and/or the ranking, wherein the model is useful for producing a group of optimized settings for one or more of the parameters for an estimated maximum output from one or more locations in the well field; and calibrating and/or validating the model using a second part of the set of measurement or objective data parameters from existing oil or gas wells in the shale well field.

In another preferred aspect, the computer-implemented method may further comprise: using the model to produce, for each of the one or more locations in the well field, a setting for each of one or more parameters that will provide an estimated maximum output.

In another preferred aspect, the computer-implemented method may further comprise: using one or more inverse problem solving instructions and the model to produce optimized settings for each of the one or more parameters for each location to produce a predicted maximum output therefrom.

In another preferred aspect, the computer-implemented method may further comprise: using a probability distribution function for each of the parameters associated with the one or more locations and the model to produce a probability distribution function of output from each the one or more locations.

In another preferred aspect, the computer-implemented method may further comprise: using the optimized parameter settings and the probability distribution function of output for each of the one or more locations in the well field to select the drill site and one or more parameter settings therefore.

In a further preferred aspect of the computer-implemented, the one or more parameter settings for the drill site includes one or more items from the group consisting of: optimum pad location, number of laterals in a pad, best trajectory, design of a multi-stage hydraulic fracturing jobs including lateral length, proppant and fluid amount to be injected, pressure and injection rates, number of stages, stage length, distance between stages of hydraulic fracturing, distance between laterals in a pad or between pads, distance between stages of hydraulic fracturing, and hydraulic fracturing design optimization.

In another preferred aspect of the computer-implemented, the set of measurement or objective data parameters from existing oil or gas wells in the well field is selected from the group consisting of: location of other wells; fluid type and amount; proppant type and amount; proppant concentration; injection and breakdown pressure; injection rates; instantaneous shut-in pressure (ISIP); hydraulic half length; hydraulic half height; hydraulic half width; hydraulic conductivity; porosity (%); permeability (md) gross thickness (ft); total organic content (%); water saturation (%); 30, 90, 120 and/or 180 day gas (DCRGP) and condensate production totals represented as (Mcf/D) and (bbls/D), respectively; and stimulated reservoir volume (SRV).

In a further preferred aspect of the computer-implemented, the first part of set of measurement or objective data parameters comprises about 80%.

In a further preferred aspect of the computer-implemented, the data mining comprises using fuzzy pattern recognition.

In another preferred aspect, the computer-implemented method may further comprise: using one or more Monte Carlo Simulations in the production of the probability distribution function of output from each the one or more locations.

BRIEF DESCRIPTION OF THE DRAWINGS

To enable the present invention to be easily understood and readily practiced, the present invention will now be described for purposes of illustration and not limitation, in connection with the following figures wherein:

FIG. 1 shows an exemplary distribution of 180 Days of Cumulative Rich Gas Production (180 DCRGP) from the wells in the dataset;

FIGS. 2 and 3 show the parameters preferably available in a data set according to the present disclosure;

FIG. 11 shows an exemplary list of parameters that have been used in a preferred model created according to the present disclosure.

FIG. 16 shows a preferred interface of the present disclosure.

FIG. 17 shows identification of a new well location and design of completion and stimulation for the new well according to the present disclosure.

DETAILED DESCRIPTION

Figure 4:
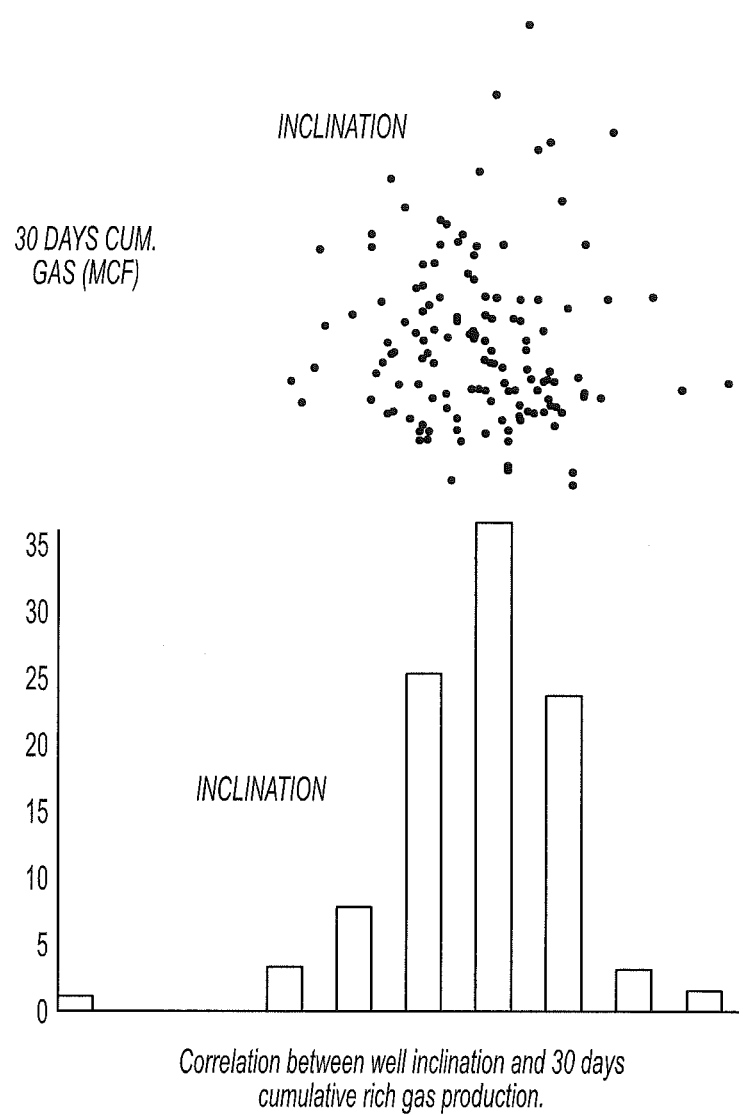
FIG. 4 shows an example of a plot of all parameters in the data set plotted against production, indicators such as 30, 90, 120, and 180 DCRGP.

An example of a data set according to the present disclosure that preferably includes 136 horizontal wells from a Marcellus Shale asset in Pennsylvania with more than 1,200 stages (3700 clusters) of hydraulic fractures. Such data set is one of the most comprehensive datasets focused on hydraulic fracturing practices in Marcellus Shale that has ever been shared with and analyzed by an independent entity. These analyses are performed by applying the methods of the present disclosure to such a dataset, as exemplified in part in FIG. 1.

PRODUCTION—A preferred data set of the present disclosure might include, for example, 136 wells that have been completed in Marcellus Shale in Pennsylvania in recent years. The data set may include more than 1,200 hydraulic fracturing stages. Some such wells may have experienced up to 20 stages of hydraulic fracturing while others may have been fractured with as few as 5 stages. The wells may have been producing rich gas within an initial production range of 1 to 10 MMcf/D. The average rich gas production for these wells may be assigned to have an initial production rate of 5 MMcf/D.

The highly productive wells may have produced as much as 12 MMCF/D of rich gas and the least productive wells have produced as little as 4 MCF/D of rich gas. This shows a significant variation in gas and liquid (condensate) production from these wells. FIG. 1 shows an exemplary distribution of 180 Days of Cumulative Rich Gas Production (180 DCRGP) from the wells in the dataset.

HYDRAULIC FRACTURING—The diversity of production displayed in FIG. 1 may reflect a diversity of reservoir characteristics as well as completion and hydraulic fracturing characteristics in these wells. The perforated lateral length in these wells ranges from 1,500 to 5,800 ft. The total injected proppant in these wells ranges from a minimum of about 99,500 lbs to a maximum of about 8,350,000 lbs and total slurry volume of about 43,000 bbls to 195,000 bbls.

RESERVOIR CHARACTERISTICS—"Porosity" of the Upper Marcellus varies from 4.5 to 11.2 percent while its "Gross Thickness" is measured to be between 40 to 124 ft with a 'Total Organic Content" (TOC) between 2 to 4 percent. Lower Marcellus, which seems to include the more productive section of the reservoir, has "Porosity" of 9 to 15 percent, "Gross Thickness" between 50 to 130 ft and TOC of 2.2 to 5.8 percent.

FIGS. 2 and 3 show the parameters available in this data set that includes well location and trajectory, reservoir characteristics, completion, and stimulation, as well as production characteristics from 136 completed, producing Marcellus Shale wells.

It is a well-known fact that fluid flow in shale is a highly complex phenomenon that is (at a minimum) characterized by dual porosity, stress dependent permeability, highly naturally fractured medium that is controlled by both pressure dependent Darcy's law (both laminar and turbulent flow), and concentration dependent Fick's law of diffusion. These complexities contribute to challenges that are associated with developing numerical reservoir simulation models to describe, history match and forecast production behavior in these formations.

Inclusion of massive, multi-cluster, multi-stage hydraulic fractures only exacerbates the difficulties associated with the modeling of production from wells in Marcellus and other shale formations (such as the Eagle Ford, Bakken, Haynesville and Utica). As the number of producing wells increases in a given field (asset), developing full field numerical reservoir simulation models becomes a complex and time consuming effort, with limited published success.

The above-mentioned facts illustrate the complex behavior of fluid flow and production from such reservoirs and a data set according to the present disclosure captures this complexity. In this section, the present disclosure shows the complexity of the production behavior from this reservoir by displaying the lack of any apparent or suggestive correlation between the reservoir and completion parameters with the production from the wells.

To demonstrate this complexity, all parameters in the data set were plotted against production indicators such as 30, 90, 120, and 180 DCRGP to see if there are any apparent trends or patterns in the data. These plots were made in Cartesian, semi-log and log-log scale. No trends or patterns were observed. FIG. 4 shows an example.

Although only single parameter plots are shown in this summarized report, more analyses have been performed that include three-dimensional plots of all combinations of parameters as well as analyses with production data that are normalized per foot of lateral length or per foot of net pay thickness. Possible patterns and correlations were sought from plots of well, reservoir or completion parameters versus production indicators that clustered wells based on the location and/or BTU values. The results have been the same—no apparent correlations.

Although the lack of correlation is not surprising, it may appear unfortunate that this lack of correlation can result in a lack of predictability of production from these wells. But as demonstrate by the present disclosure, predictive models can be developed, even for complex systems such as this, using advanced data mining and predictive data-driven technologies.

As mentioned before, in addition to the two dimensional Cartesian, semi-log and log-log plots, investigated under the present disclosure were three-dimensional plotting of the data with and without classification of wells into bins based on their production behavior and BTU values as well as normalization of the production as a function of lateral length and net thickness. None of these efforts to correlate production indicators with well, reservoir, completion and stimulation characteristics proved to be fruitful. Also employed under the present disclosure were advanced statistical techniques such as Analysis Of Variance (ANOVA) to detect any possible correlation between any of the parameters in the data set. Not much resulted from that effort either.

Artificial Intelligence & Data Mining

Once the conventional analysis proved to be limited in application, Artificial Intelligence & Data Mining (AI&DM) was employed to analyze the dataset. The AI&DM-based analyses were performed using a software application providing the means for Descriptive Data Mining, Data-Driven Predictive Modeling and Predictive Data Mining. The final product of the analysis is a tool according to the present disclosure that allows engineers to identify optimum location of the next well and design its trajectory. It also provides the means to design optimum completion and stimulation job by optimizing parameters such as the fluid and proppant amounts that needs to be injected, as well as pressure and rate of injection. As expected, optimum values of hydraulic fracturing parameters may end up being functions of many other parameters including reservoir characteristics at the location of the well. Furthermore, production from each well can be estimated while uncertainties associated with the reservoir characteristics are quantified.

Descriptive Data Mining

Preferred Descriptive Data Mining according to the present disclosure may be described as unconventional data visualization that tries to display the data in a completely new set of dimensions without adding anything to the data set. Desirable according to the present disclosure is the discovery and display of meaningful patterns in seemingly chaotic data. Descriptive Data Mining under the present disclosure is preferably divided into three steps: Fuzzy Pattern Recognition, Key Performance Indicator, and Well Quality Analysis. Any patterns or correlations in the data, even though complex or hidden, will be uncovered by the present disclosure's Descriptive Data Mining which is capable of deducing and displaying the same.

Fuzzy Pattern Recognition (FPR)

Pattern recognition is a branch of artificial intelligence concerned with the classification or description of observations. Pattern recognition aims to classify data (patterns) based on either a priori knowledge or on statistical information extracted from the patterns.

The patterns to be classified are usually groups of measurements or observations, defining points in an appropriate multidimensional space.

Figure 5:
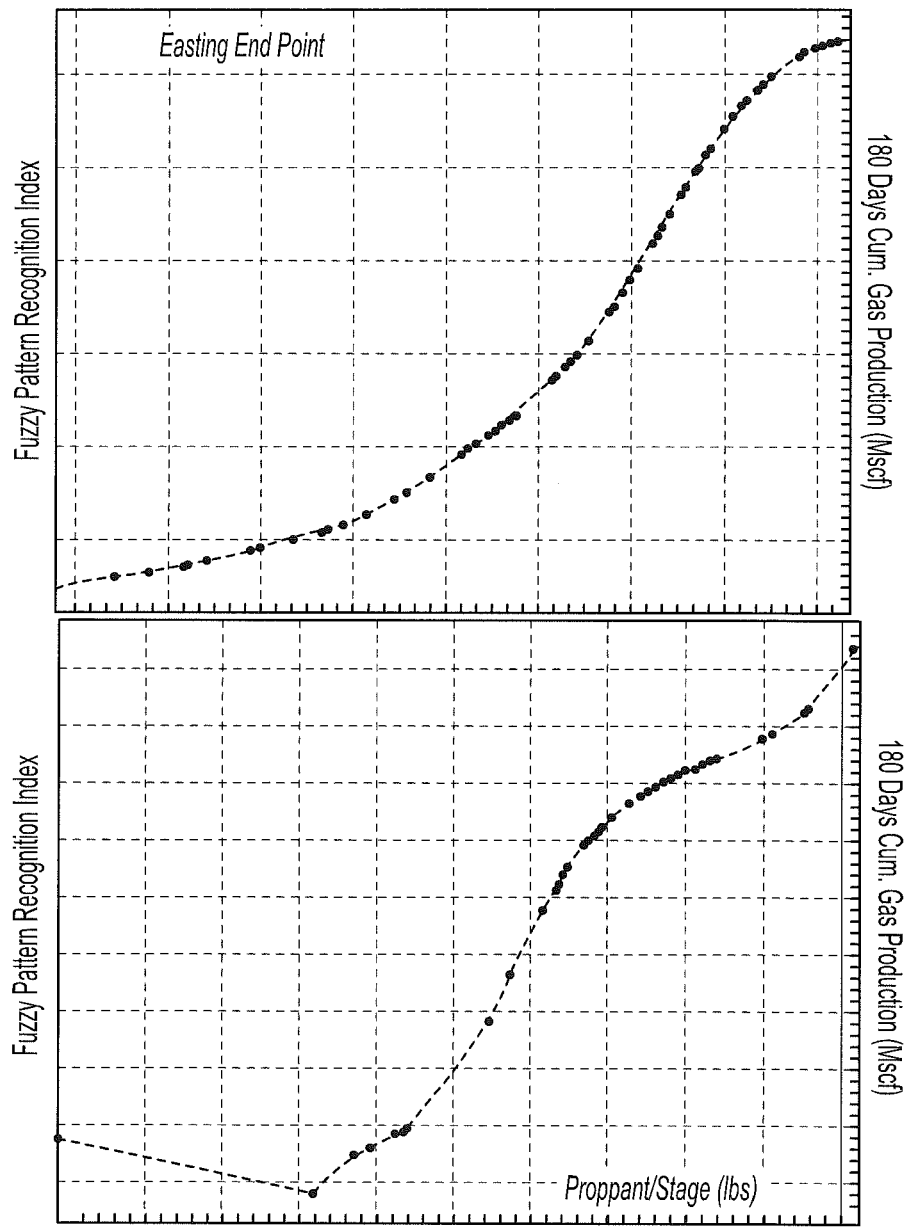
FIG. 5 shows the result of the FPR algorithm when it is applied to two of the parameters (Easting End Point (Longitude) and Total Proppant Injected per Stage) in the dataset in order to explore their correlation with the 180 DCRGP.

Fuzzy Pattern Recognition (FPR) of the present disclosure preferably is the integration of Fuzzy Logic with Pattern Recognition. The results are understandable and observable trends from seemingly chaotic behavior as shown in FIG. 5. FIG. 5 shows the result of the FPR algorithm when it is applied to two of the parameters (Easting End Point (Longitude) and Total Proppant Injected per Stage) in the dataset in order to explore their correlation with the 180 DCRGP. In FIG. 5 both FPR and actual data are plotted. The actual data (gray dots—y-axis on the right hand side) is shown in Cartesian scale for reference. The scatter of the actual data demonstrates the lack of apparent correlation between parameters with the gas production. On the other hand the FPR displays a well-behaved curve with easily detectable (non-linear) trends in both plots. The scale of FPR is dimensionless and relative and has been normalized.

Key Performance Indicators (KPI)

Figure 6:
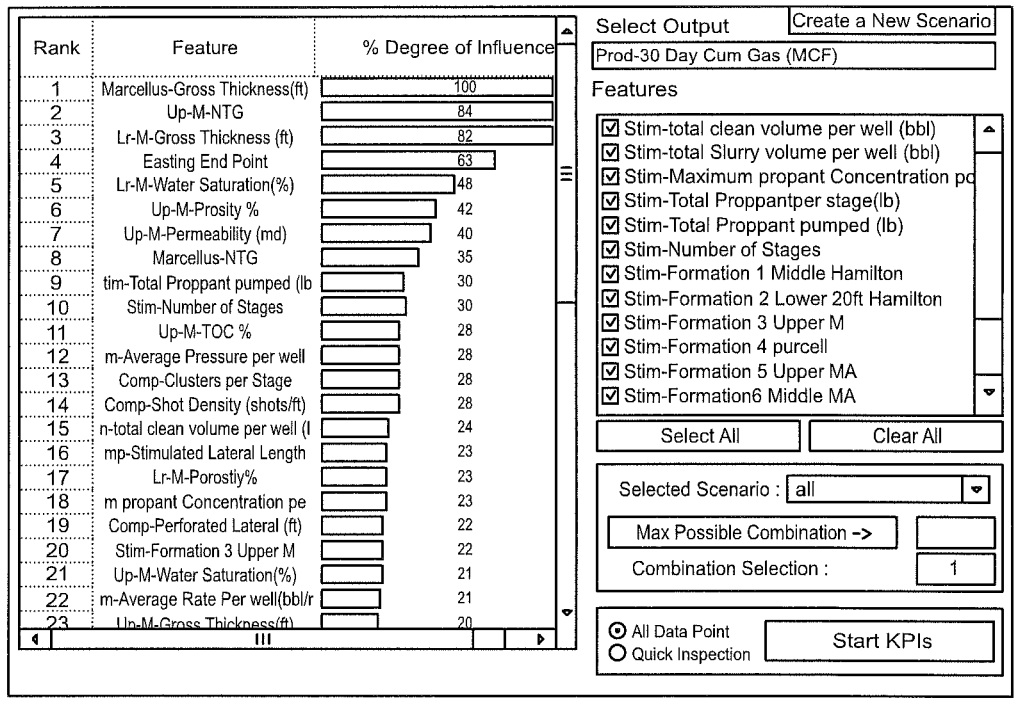
FIG. 6 is a tornado chart that ranks the impact of all the parameters, also known as Key Performance Indicators (KPI) the present disclosure.

Using the FPR technology of the present disclosure, the contribution (influence) of each of the parameters on any given production indicator can be calculated and compared. The result is a tornado chart that ranks the impact of all the parameters, also known as Key Performance Indicators (KPI). An example of the result of such analyses is shown in FIG. 6. Upon completion of the KPI analyses of the present disclosure, the ranking of the parameters can be processed in order to analyze impact of the parameters influence on gas and condensate production as a function of the production length.

Figure 7:
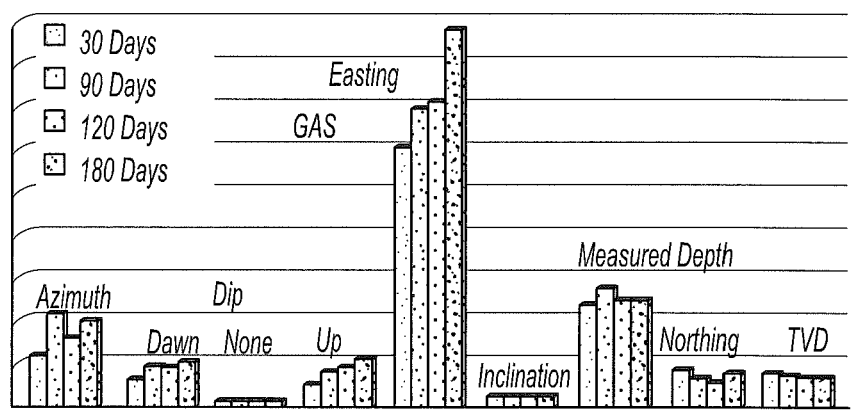
FIG. 7 shows the impact of changes in different well characteristics (location and trajectory) on gas production.

By performing KPI analysis one can identify the impact of changes in different parameters, relative to one another, on gas and condensate production. For example, FIG. 7 shows the impact of changes in different well characteristics (location and trajectory) on gas production. These impacts are examined for 30, 90,120, and 180 DCGP. FIG. 7 shows in this example that within the well location group, the single most important parameter that has the greatest impact on gas production (as far as the well location and trajectory are concerned) is the "Easting End Point" (well location along the west-east axis) of the well. Furthermore, it indicates that the importance of the variations of this parameter become more pronounced with the length of time of production.

The next two parameters that are a distant second to the "Easting End Point" are the "Measured Depth" and "Azimuth" without any convincing trend about the change of their influence as a function of length of production. It is interesting to note that changes in dipping, inclination and other parameters play an insignificant role when they are compared to the "Easting End Point". This is an interesting finding that can help in placing the next set of wells (pads) in this particular field.

Figure 8:
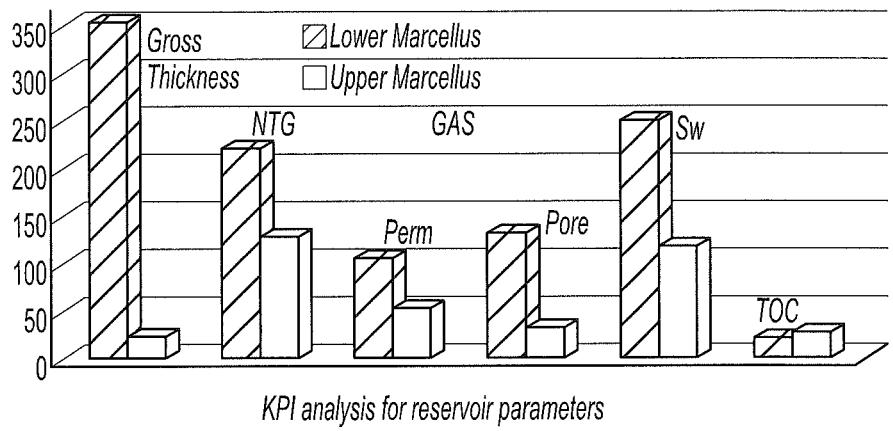
FIG. 8 is a chart showing in one example that reservoir characteristics of lower Marcellus have more pronounced impact on gas production than do the upper Marcellus characteristics.

Similar analyses are performed for reservoir characteristics. Reservoir characteristics of lower Marcellus have a more distinct impact on production when compared to those of upper Marcellus. FIG. 8 shows in this example that reservoir characteristics of lower Marcellus have more pronounced impact on gas production than do the upper Marcellus characteristics. The length of the bars in FIGS. 7 and 8 are dimensionless and an indication of influence of parameters.

It is also evident from the figure that the most influential parameter is the change in the "Gross Thickness" of lower Marcellus followed by "Net To Gross" ratio and "Initial Water Saturation." "Total Organic Carbon" (TOC) content plays the least important role when compared with other parameters. This is reasonable since it is expected that TOC is not an important contributor during early stages of production.

Furthermore, given the fact that the KPI analysis concentrates on the impact of changes of different parameters on production, it may be observed that lack of influence of one parameter may have to do with the fact that little (or insignificant) change has been recorded for that parameter in the dataset.

Well Quality Analysis (WQA)

The next step in Descriptive Data Mining of the present disclosure is the Well Quality Analysis (WQA). This is another unique and proprietary process through which the data in the data set is averaged using the principles of Fuzzy Set Theory and plotted using bar charts in order to reveal hidden patterns in the data. During this process nothing is added or removed from the data.

Well Quality Analysis (WQA) is a two-step process. In the first step a target production indicator is selected and the quality of wells in the field is classified based on this target production indicator. In this case, 180 Days Cumulative Rich Gas Production (DCRGP) was used to be the target production indicator. Then Fuzzy Set Theory is used to define well qualities based on the target production indicator. The 180DCRGP in this data set start from a minimum value of 50 MMcf to a maximum of 1,500 MMcf. We defined four different well qualities within these ranges as follows:
Poor Wells: 180DCGP range of 50-280 MMcf.
Average Wells: 180DCGP range of 150-600 MMcf.
Good Wells: 180DCGP range of 400-800 MMcf.
Excellent Wells: 180DCGP range of 700-1,500 MMcf.

Figure 9:
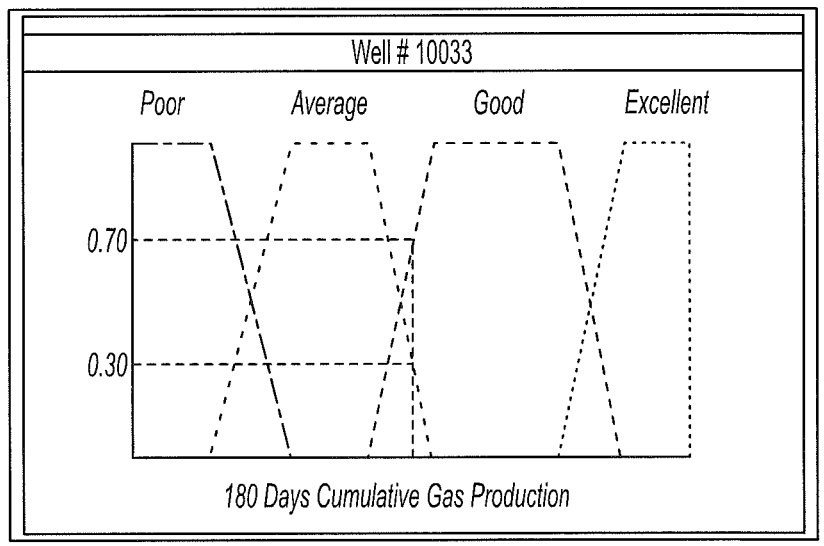
FIG. 9 shows the qualitative definition of 180DCRGP where several regions of overlap can be observed.

In the qualitative definition of 180DCRGP shown in FIG. 9 several regions of overlap can be observed. This is one of the unique features of this visualization technology of the present disclosure. For example poor wells and average wells overlap in the 180DCRGP range of 150 MMcf and 280 MMcf, average wells and good wells overlap in the 180DCRGP range of 400 MMcf and 500 MMcf, while good and excellent wells overlap in the 180DCRGP range of 700 MMcf and 800 MMcf.

Once all wells are defined using this qualitative definition, step two of the process starts. The second step of this analysis, the visualization, calculates and plots all the parameters of the dataset based on the fuzzy membership function of the well qualities as defined in Step 1 and shown in FIG. 9.

Figure 10:
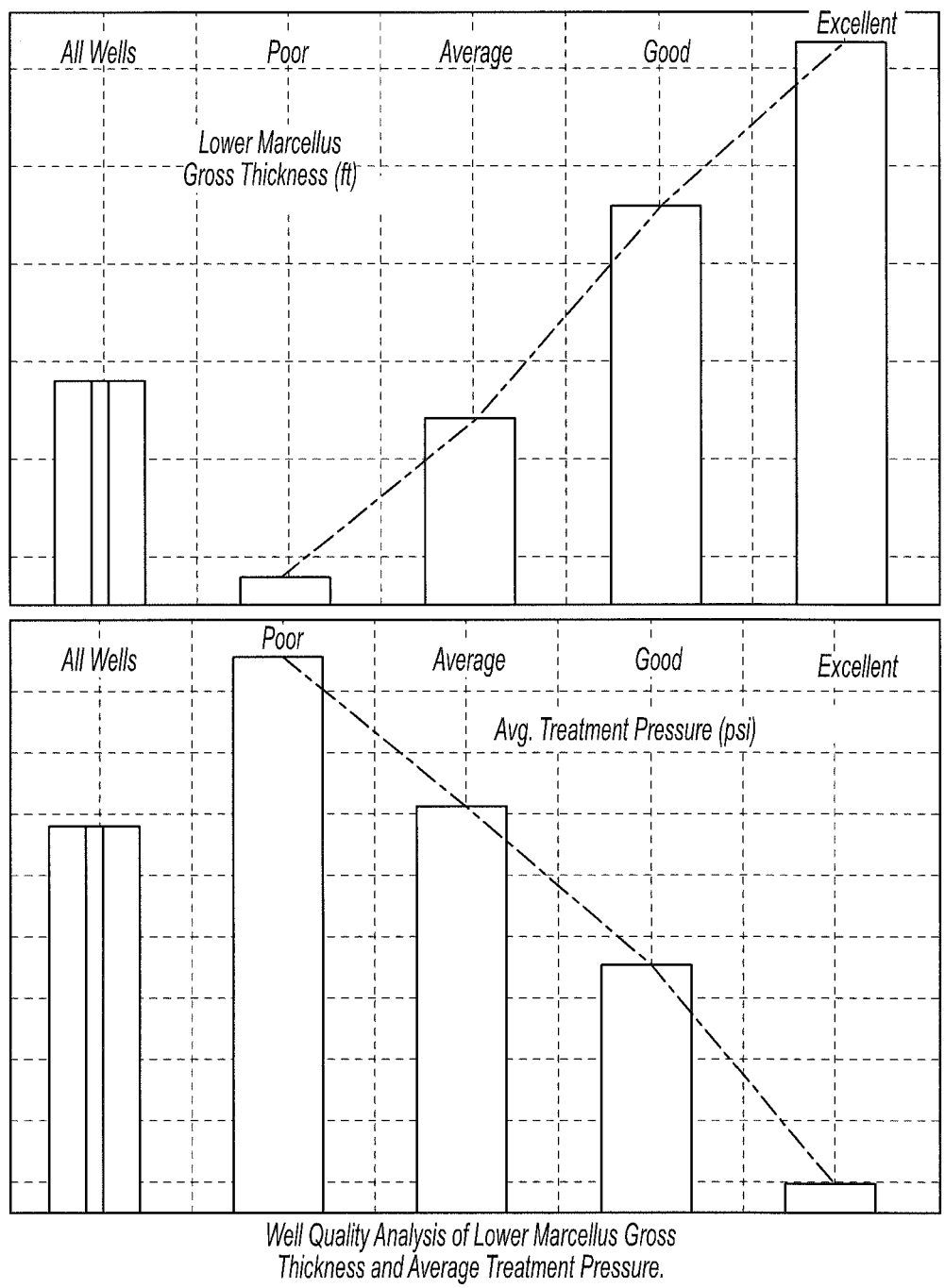
FIG. 10 includes WQA plots of Lower Marcellus Gross Thickness and Average Treating Pressure.

FIG. 10 includes WQA plots of Lower Marcellus Gross Thickness and Average Treating Pressure. The plot at the top of FIG. 10 indicates that although the average Gross Thickness of all wells in the dataset is 95 ft, the "Excellent" wells have an average Gross Thickness of 118 ft; the "Good" wells have an average Gross Thickness of 100 ft while the "Average" wells and "Poor" wells' average Gross Thickness are 82 and 75 ft, respectively.

As expected, better wells have higher average Gross Thickness, as the plot clearly displays. This of course is a known fact (although not quite clear from the simple plots of the actual data from the field) and is shown here to demonstrate the accuracy of this visualization technique. This helps one to realize that the preferred methods and systems of the present disclosure can provide valuable information for other parameters that do not have such an obvious and intuitive impact on well productivity. The second plot in FIG. 10 is a good example of such a case.

The plot at the bottom of FIG. 10 indicates that, in the data set "Excellent" wells have been treated with an average pressure of 6,500 psi, the "Good" and "Average" wells have generally been treated with an average treatment pressure of 6,625 and 6,750 psi, respectively, and the "Poor" wells have been treated with an average treatment pressure of 6,795 psi. The plot displays a clear trend that wells with higher productivity, have historically been treated at lower pressures.

Two distinct and clearly opposite trends are visible in these two parameters as shown in FIG. 10 once they are plotted using Descriptive Data Mining visualization technology of the present disclosure.

Data-Driven Predictive Modeling

Building data-driven predictive models of the rich gas production from wells that have been drilled, completed and stimulated with massive hydraulic fractures in Marcellus Shale is the next step according the present disclosure.

The data-driven predictive models are designed to achieve an important objective that has been missing in physics-based models such as reservoir simulation models. One of the desirable goals of data-driven predictive models is to include "Hard Data" (fluid type and amount, proppant type and amount, proppant concentration, injection pressure and rates) into the modeling process. By using "Hard Data" as input to the data-driven predictive models, the present disclosure builds a foundation upon which the design of optimum hydraulic fractures in shale formations may be accomplished by solving the inverse problem.

Training, calibration and validation of data-driven predictive models is done through a process in which advanced machine learning technologies are used to couple well location and trajectory, reservoir characteristics and completion with detail stimulation practices and correlate them with the target production indicator (180 Days Cumulative Rich Gas Production). FIG. 11 shows an exemplary list of parameters that have been used in a preferred model created according to the present disclosure.

Figure 12:
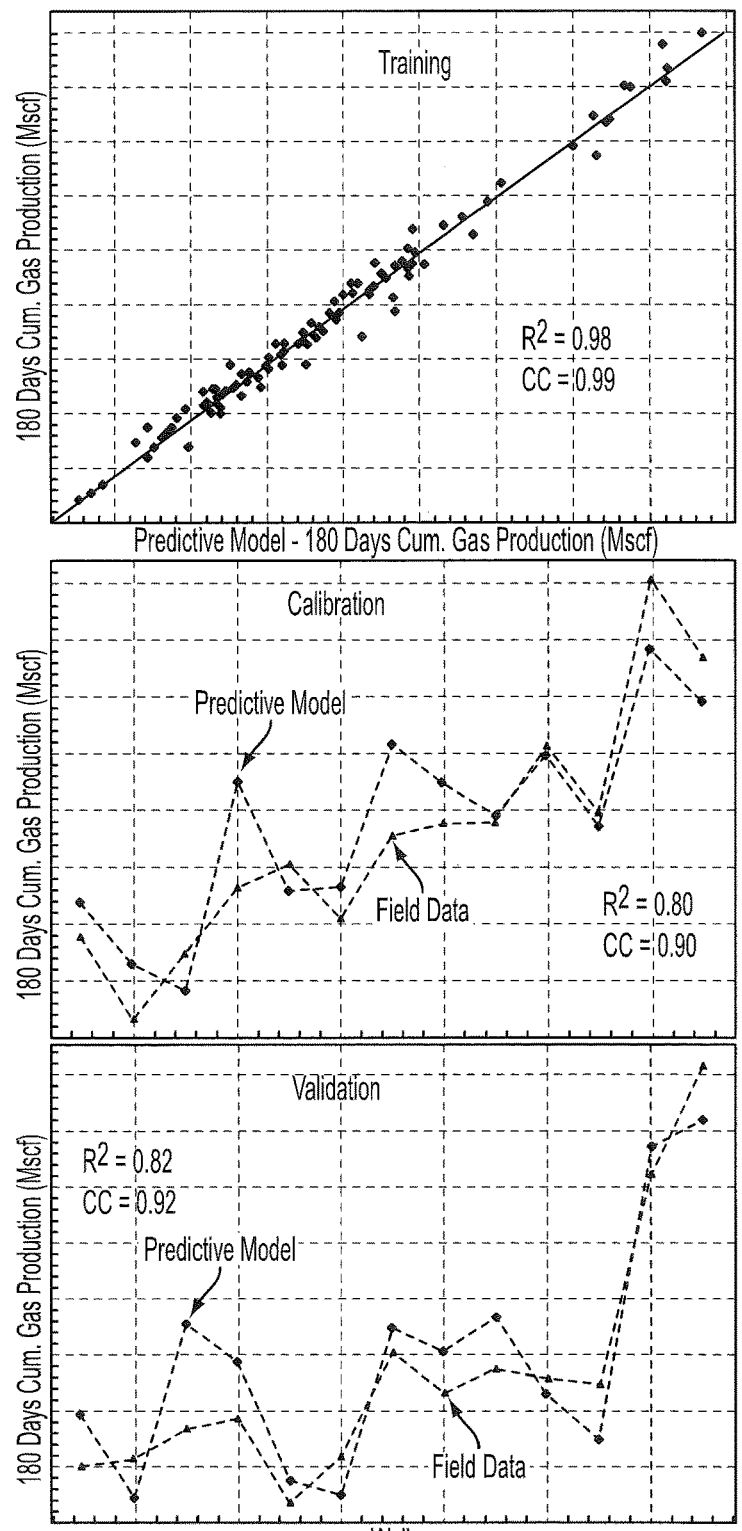
FIG. 12 shows the results of data driven predictive modeling according to the present disclosure.

A preferred data-driven predictive model of the present disclosure was developed using 80% of the data while the remaining 20% was left for calibration and validation purposes (blind data) and was not used during the building of the model. FIG. 12 shows the results of data driven predictive modeling. The training dataset has a $R^2$=0.98 and a correlation coefficient of 0.99 while the $R^2$ and correlation coefficient for the blind data is as follows: calibration dataset has $R^2$ and correlation coefficient of 0.80 and 0.90 while validation dataset has $R^2$ and correlation coefficient of 0.82 and 0.92 respectively.

These statistics of predictive capabilities of a model according to the present disclosure are quite impressive for such complex behavior.

Once the predictive model is trained, calibrated and validated for accuracy, it is used for multiple purposes. The validated data-driven predictive model is used for post-modeling sensitivity analysis, as well as for quantification of uncertainties associated with some of the data used during the modeling process, such as reservoir characteristics.

Furthermore, the data-driven predictive model is setup as the objective function of an inverse problem to perform optimization on the "Hard Data". According to the present disclosure, sensitivity analysis and the optimization of the hydraulic fracture procedure may be used successfully to design optimum fracturing jobs for new wells.

Upon completion of the design of the fracturing job and by using Monte Carlo Simulation method according to the present disclosure, 180 DCRGP of the well is predicted, while quantifying the uncertainties that are associated with the reservoir characteristics at the location where the new well is being planned.

Single Parameter Sensitivity Analysis

During the single parameter sensitivity analysis of the present disclosure, one parameter is selected (at a time) for analysis. While all other parameters are kept constant, the value of the selected parameter is varied throughout its range and each time the predictive model output (180 DCRGP) is calculated. The result of such an analysis is plotted as FIG. 13.

Figure 13:
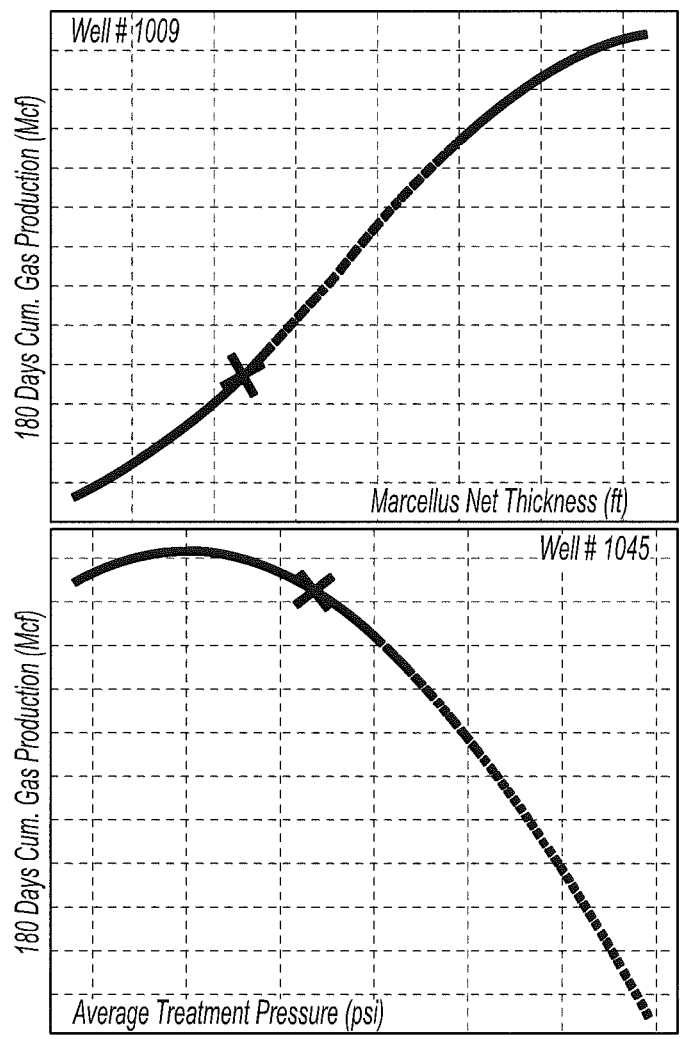
FIG. 13 shows the results of the single parameter sensitivity analysis of the present disclosure.

In FIG. 13 the y-axis in both plots is the model output (180 DCRGP) while the x-axis is the parameter that is being examined. For example, the top plot of FIG. 13 shows the changes in 180 DCRGP as a function of Net Thickness of the Marcellus Shale, while the plot at the bottom shows the sensitivity of 180 DCGP to Average Treatment Pressure. The cross (X) in each of the plots indicates the actual 180 DCRGP for the well.

Uncertainty Analysis

Monte Carlo Simulation (MCS) is preferably used under the present disclosure to perform uncertainty analysis. To perform MCS, a probability distribution function is preferably selected for each of the parameters that are going to be analyzed. The distribution should usually cover the range of the parameter in the data set. Then, the predictive model is executed thousands of times, each time randomly selecting a combination of the values of the parameters from their corresponding probability distribution. The result of this analysis is a probability distribution function of the output (180 DCRGP). This distribution shows the result of uncertainties associated with the combination of parameters that have been selected as the target parameters in the analysis.

Figure 14:
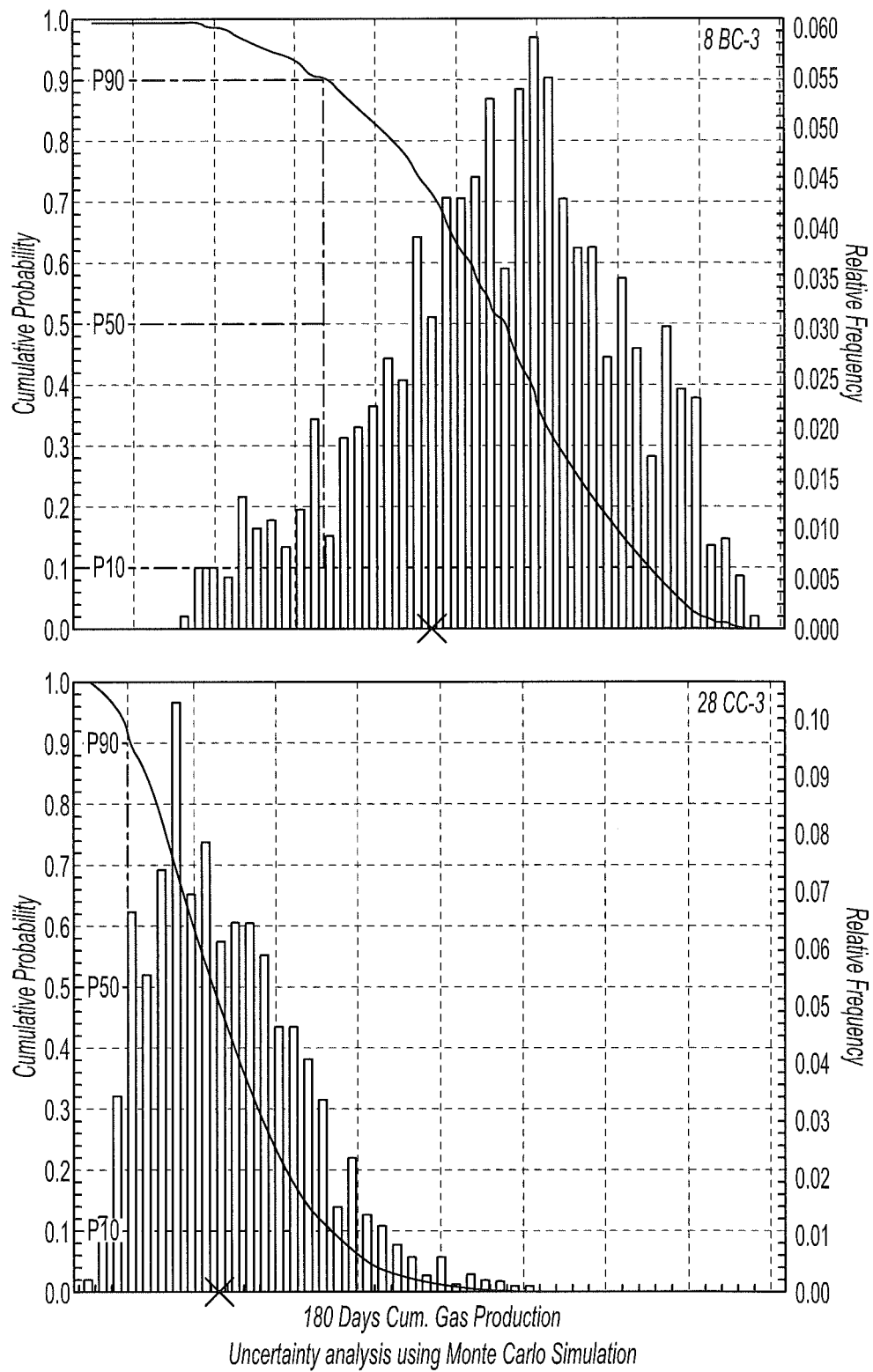
FIG. 14 shows the results of the Monte Carlo Simulation technique for two Marcellus wells according to the present disclosure.

FIG. 14 shows the results of the Monte Carlo Simulation technique for two Marcellus wells according to the present disclosure. The selected parameters analyzed in this figure are all completion and stimulation parameters in the model (see FIG. 11 for the list).

In FIG. 14 the graph on the top shows the results of uncertainty analysis performed on well "8 BC-3". The y-axis shows the probability values (probability distribution on the right and cumulative probability on the left) and the x-axis shows the possible range of 180 DCRGP that could be achieved. The P10, P50 and P90 for this well are 750 MMcf, 570 MMcf and 350 MMcf, respectively. The crosses on the x-axis shows the actual 180 DCRGP for this well. If P50 be used as the overall expected value (for each well) that can be achieved from a typical frac job, then the field production for this well (475 MMcf—P70) indicates a less than expected hydraulic fracturing outcome. In other words, this analysis indicates that given the well location and trajectory as well as reservoir characteristics and completion (lateral length and number of stages) a reasonably well designed frac job on this well could have (and should have) resulted in (at least) 20% higher production.

The graph on the bottom of FIG. 14 shows the results of uncertainty analysis performed on well "28 CC-3". The distribution of the 180 DCRGP for this well is skewed to the left indicating a higher probability of lower production. The P10, P50 and P90 for this well are 350 MMcf, 200 MMcf and 105 MMcf, respectively. The field production for this well (205 MMcf—P45) indicated a slightly better production than expected. This analysis shows that the frac job performed on this well is a reasonably designed frac job. Nevertheless, in both cases (shown in FIG. 14) the frac job could have been modified to achieve higher productions.

Type Curves

Upon successful development of the data-driven predictive model, type curves are generated to assist engineers during the decision-making process. Decisions such as where to place the next well (or which of the planned wells should get priority for drilling) and how to complete and stimulate can benefit from these type curves. Type curves can be generated for individual wells, for groups of wells, and for the entire field. In type curves, the y-axis represents the model output (180 DCRGP). The x-axis is selected from the list of all the input parameters and the curves represent a third parameter from those used as input to the model.

Figure 15:
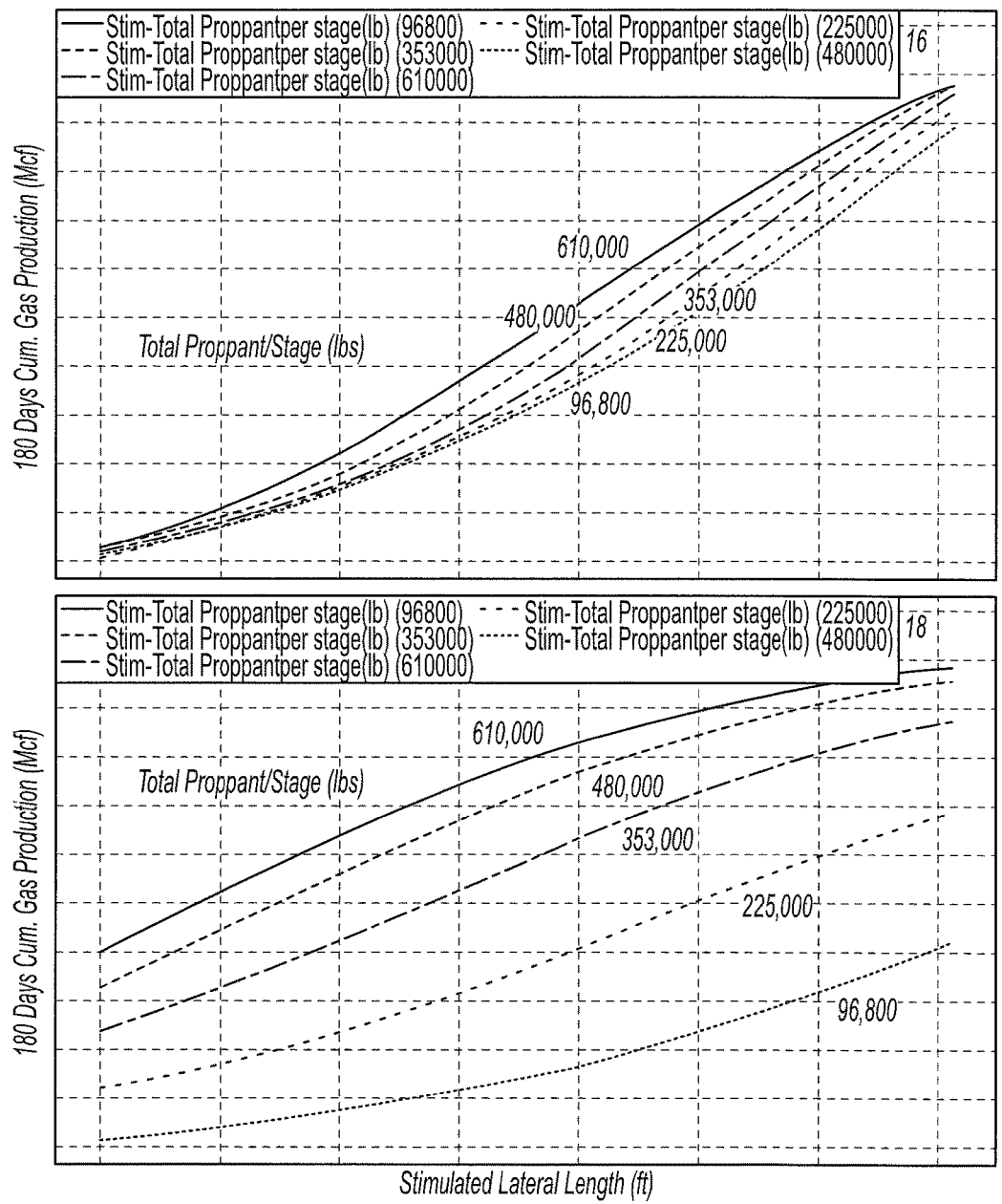
FIG. 15 shows the type curves for Total Proppant per Stage as a function of Stimulated Lateral Length for two wells.

FIG. 15 shows the type curves for Total Proppant per Stage as a function of Stimulated Lateral Length for two wells. It is interesting to note the differences in the behavior of these two wells (located in different regions of the asset). While production seems to be significantly impacted by the amount of Proppant per stage for the well on bottom (well #18), it is far less sensitive to the Proppant per stage in the well on top (well #16).

This clearly shows the complexities associated with production from shale formations and why the cookie-cutter approaches in design of hydraulic frac jobs undermines the actual production potentials from shale wells.

Using the Analyses

These analyses of the present disclosure may preferably be used to recommend new well locations and well trajectory as well as to design optimum completions/frac jobs. To plan a new well according to the present disclosure, the initial location is selected based on a previous plan, or the method that has been used in the past, or randomly. Once the initial location of the well is identified, the following calculations are automatically performed (by the software application) and the results are presented.

Reservoir characteristics are estimated for the new location by geo-statistics using the offset wells closest to the proposed location. The average value for the well trajectory, completion and frac job parameters are estimated based on one of the following averages: a) average values from the field, b) average values of the region {well dusters}, or c) average values of certain number of neighboring offset wells. This is a user selection.

The predictive model of the present disclosure is used to estimate the "180 DCRGP" for the new well (or any other production indicator used during the model development). This production value would-serve as the-initial estimate. In the following steps, the predictive model is used to optimize this production estimate.

Using the analyses of the present disclosure (type curves, best practices . . . ), the controllable parameters (well trajectory, completion and stimulation design parameters) are modified while the impact of this modifications on the "180 DCRGP" is observed in real-time. FIG. 16 shows the interface for these steps. The user may simply move the sliders to change the value of the parameter. The height of the bar chart changes in response to the modifications made to the input parameters, in real-time.

Once an optimum set of parameters that provide the highest possible production is identified, an uncertainty analysis should be performed, preferably using Monte Carlo Simulation so that uncertainties associated with reservoir characteristics may be analyzed and quantified. P10, P50, and P90 of the "180 DCRGP" for this location and the designed trajectory and frac job are presented. A preferred GUI for this step according to the present disclosure is shown in FIGS. 16 and 17.

Upon completion of this step, the location of the well can be changed and the steps above are repeated until the best location and the optimum completion design is reached. Preferably, software according to the present disclosure will have an automatic optimization option so that all the above mentioned steps can be performed automatically.

Reservoir & Production Management of Marcellus Shale

The present disclosure has shown the utility of advanced data mining and predictive data-driven analytics technologies and their application to shale formations with an example for Marcellus Shale in Pennsylvania.

This innovative application of advanced data mining and predictive data-driven analytics technologies has the potential to be used as an effective reservoir and production management tool. There are two important advantages to this technology when compared with other potential alternatives. These advantages are 1) the small computational foot-print and 2) the speed of execution. Once trained, calibrated and validated, the predictive models that result from such analyses of the present disclosure will run and provide results in fractions of a second. Their small computational footprint makes these models ideal to be ported on tablets (or even smart phones) for use by scientists and upper management to perform quick analyses and possible decision-making.

Figure 18:
FIG. 18 shows an example of the possible application of such models on a tablet computer according to the present disclosure.

An example of the possible application of such models on a tablet computer according to the present disclosure is shown in FIG. 18.

The present disclosure has demonstrated that hydraulic fracturing in shale wells can and should be optimized using advanced data-driven analytics and data mining technologies. It has also shown that the "One Size Fits AH" approach to design and implementation of frac jobs in shale wells fails to take full advantage of their production potentials.

The AI&DM-based analyses of the present disclosure consist of basic and advanced statistical analysis, descriptive data mining, data-driven predictive modeling and predictive data mining". The data-driven predictive model of the present disclosure includes coupling of all major contributors to the fluid flow in shale including well location and trajectory, reservoir characteristics and hydraulic fracturing parameters.

The final result of the present disclosure is a tool for designing optimum hydraulic fractures for the planned wells. The tool estimates the gas and liquid production from each well taking into account uncertainties associated with reservoir characteristics and completion and stimulation practices. It preferably may also analyze past practices in order to generate a list of data driven, unbiased best practices for the field that can be customized for any group of wells (that share a common theme or characteristics).

Analysis according to the present disclosure have shown that out of the 136 wells in the exemplary asset more than 75% of them have been completed and hydraulically fractured in a manner that provide "Excellent", "Better than Expected", or "As Expected" results.

Preferably, the main steps in the development of a reservoir model according to the present disclosure are described below.

Spatio-temporal database development—The first step in developing a data driven shale model according to the present disclosure is preparing a representative spatio-temporal database (data acquisition and preprocessing). The extent at which this spatiotemporal database actually represents the fluid flow behavior of the reservoir that is being modeled, determines the potential degree of success in developing a successful model. The nature and class of the AI-based shale reservoir model is determined by the source of this database. The term spatio-temporal defines the essence of this database and is inspired from the physics that controls this phenomenon. An extensive data mining and analysis process should be conducted at this step to fully understand the data that is housed in this database. The data compilation, curation, quality control and preprocessing are some of the most important and time consuming steps in developing an AI-based Reservoir Model according to the present disclosure.

Simultaneous training and history matching of the reservoir model—In conventional numerical reservoir simulation the base model will be modified to match production history, while AI-based reservoir modeling according to the present disclosure starts with the static model and endeavors to honor it and not modify it during the history matching process. Instead, in the system and method of the present disclosure, uncertainties associated with this static model will be analyzed and quantified the at a later stage in the development. The model development and history matching in AI-based shale reservoir model are performed simultaneously during the training process. The main objective is to make sure that the AI-based shale reservoir model teams fluid flow behavior in the shale reservoir being modeled. The spatio-temporal database developed in the previous step is the main source of information for building and history matching the AI-based Reservoir Model.

According to the present disclosure, multilayer neural networks or multilayer perceptions are used (Hykin 1999). These neural networks are appropriate for pattern recognition purposes in case of dealing with non-linear cases. The neural network consists of one hidden layer with different number of hidden neurons, which have been optimized based on the number of data records and the number of inputs in training, calibration and verification process.

It is extremely important to have a clear and robust strategy for validating the predictive capability of the AI-based Reservoir Model of the present disclosure. The model must be validated using completely blind data that has not been used, in any shape or form, during the development of the model. Both training and calibration datasets that are used during the initial training and history matching of the model are considered non-blind.

Some may argue that the calibration—also known as testing dataset—is also blind. This argument has some merits but if used during the development of the AI-based shale reservoir model, can compromise validity and predictability of the model and therefore such practices are not recommended under the present disclosure.

Sensitivity analysis and quantification of uncertainties—During the model development and history matching that was defined in the training step, the static model is not modified. Lack of such modifications may present a weakness of this technology, knowing the fact that the static model includes inherent uncertainties. To address this, the AI-based Reservoir Modeling workflow of the present disclosure preferably includes a comprehensive set of sensitivity and uncertainty analyses.

During this step, the developed and history matched model is thoroughly examined against a wide range of changes in reservoir characteristics and/or operational constraints. The changes in pressure or production rate at each well are examined against potential modification of any and all the parameters that have been involved in the modeling process. These sensitivity and uncertainty analyses include single- and combinatorial-parameter sensitivity analyses, quantification of uncertainties using Monte Carlo simulation methods and finally development of type curves. All these analyses can be performed on individual wells, groups of wells or for the entire field.

Deployment of the model in predictive mode—The trained, history matched and validated AI-based shale reservoir model is deployed in predictive mode in order to be used for performing reservoir management and decision making purposes according to the present disclosure.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A computer system, comprising:
    one or more processors; and
    a memory coupled to the one or more processors, wherein the computer system is programmed with a set of computer-readable instructions configured to implement a method for determining a drill site in a shale, tight gas sands, coal bed methane or other unconventional well field for an oil or gas well and one or more parameter settings therefor, the computer-readable instructions comprising:
        one or more data mining instructions for data mining of a first part of a set of measurement or objective data parameters from existing oil or gas wells in the well field that, when executed, produce a ranking of each parameter and its respective effect on oil or gas well production from the well field;
        one or more training instructions that, when executed, produce a model comprising an artificial neural network (ANN) trained with the first part of the set of measurement or objective data parameters and/or the ranking that is useful for producing a group of optimized settings for one or more of the parameters for an estimated maximum output from one or more locations in the well field;
        one or more calibration and/or validation instructions that, when executed, calibrate and/or validate the model using a second part of the set of measurement or objective data parameters from existing oil or gas wells in the well field; and
        one or more generation instructions that, when executed, generate a graphical illustration based on the model,
        wherein the graphical illustration includes a new well to be drilled based on the model and a potential cumulative hydrocarbon production of the new well for a predetermined period.

2. The computer system of claim 1 further comprising:
    one or more optimization instructions that, when executed, use the model to produce, for each of the one or more locations in the well field, a setting for each of one or more parameters that will provide an estimated maximum output.

3. The computer system of claim 2 further comprising:
    one or more inverse problem solving instructions that, when executed, use the model to produce optimized settings for each of the one or more parameters for each location to produce a predicted maximum output therefrom.

4. The computer system of claim 3 further comprising:
one or more uncertainty analysis instructions that, when executed, use a probability distribution function for each of the parameters associated with the one or more locations and the model to produce a probability distribution function of output from each the one or more locations.

5. The computer system of claim 4 further comprising:
one or more selection instructions that, when executed, use the optimized parameter settings and the probability distribution function of output for each of the one or more locations in the well field to select the drill site and one or more parameter settings therefor.

6. The computer system of claim 4, wherein the one or more uncertainty analysis instructions comprises one or more Monte Carlo Simulation instructions.

7. The computer system of claim 1, wherein the one or more parameter settings for the drill site includes one or more items from the group consisting of: optimum pad location, number of laterals in a pad, best trajectory, design of a multi-stage hydraulic fracturing jobs including lateral length, proppant and fluid amount to be injected, pressure and injection rates, number of stages, stage length, distance between stages of hydraulic fracturing, distance between laterals in a pad or between pads, distance between stages of hydraulic fracturing, and hydraulic fracturing design optimization.

8. The computer system of claim 1, wherein the set of measurement or objective data parameters from existing oil or gas wells in the well field is selected from the group consisting of: location of other wells; fluid type and amount; proppant type and amount; proppant concentration; injection and breakdown pressure; injection rates; instantaneous shut-in pressure (ISIP); hydraulic halflength; hydraulic half height; hydraulic half width; hydraulic conductivity; porosity (%); permeability (md) gross thickness (ft); total organic content (%); water saturation (%); 30, 90, 120 and/or 180 day gas (DCRGP) and condensate production totals represented as (Mcf/D) and (bbls/D), respectively; and stimulated reservoir volume (SRV).

9. The computer system of claim 1, wherein the first part of set of measurement or objective data parameters comprises about 80%.

10. The computer system of claim 1, wherein the one or more data mining instructions comprises one or more fuzzy pattern recognition instructions.

11. A computer-implemented method for determining a drill site in a shale, tight gas sands, coal bed methane or other unconventional well field for an oil or gas well and one or more parameter settings therefor, at least a portion of the method being performed by a computing device comprising at least one processor, the method comprising:
data mining of a first part of a set of measurement or objective data parameters from existing oil or gas wells in the well field to produce a ranking of each parameter and its respective effect on oil or gas well production from the well field;
producing a model comprising an artificial neural network (ANN) trained with the first part of the set of measurement or objective data parameters and/or the ranking, wherein the model is useful for producing a group of optimized settings for one or more of the parameters for an estimated maximum output from one or more locations in the well field;
calibrating and/or validating the model using a second part of the set of measurement or objective data parameters from existing oil or gas wells in the shale well field; and
generating a graphical illustration based on the model, wherein the graphical illustration includes a new well to be drilled based on the model and a potential cumulative hydrocarbon production of the new well for a predetermined period.

12. The computer-implemented method of claim 11 further comprising:
using the model to produce, for each of the one or more locations in the well field, a setting for each of one or more parameters that will provide an estimated maximum output.

13. The computer-implemented method of claim 12 further comprising:
using one or more inverse problem solving instructions and the model to produce optimized settings for each of the one or more parameters for each location to produce a predicted maximum output therefrom.

14. The computer-implemented method of claim 13 further comprising:
using a probability distribution function for each of the parameters associated with the one or more locations and the model to produce a probability distribution function of output from each the one or more locations.

15. The computer-implemented method of claim 14 further comprising:
using the optimized parameter settings and the probability distribution function of output for each of the one or more locations in the well field to select the drill site and one or more parameter settings therefor.

16. The computer-implemented method of claim 14, further comprising using one or more Monte Carlo Simulations in the production of the probability distribution function of output from each the one or more locations.

17. The computer-implemented method of claim 11, wherein the one or more parameter settings for the drill site includes one or more items from the group consisting of: optimum pad location, number of laterals in a pad, best trajectory, design of a multi-stage hydraulic fracturing jobs including lateral length, proppant and fluid amount to be injected, pressure and injection rates, number of stages, stage length, distance between stages of hydraulic fracturing, distance between laterals in a pad or between pads, distance between stages of hydraulic fracturing, and hydraulic fracturing design optimization.

18. The computer-implemented method of claim 11, wherein the set of measurement or objective data parameters from existing oil or gas wells in the well field is selected from the group consisting of: location of other wells; fluid type and amount; proppant type and amount; proppant concentration; injection and breakdown pressure; injection rates; instantaneous shut-in pressure (ISIP); hydraulic halflength; hydraulic half height; hydraulic half width; hydraulic conductivity; porosity (%); permeability (md) gross thickness (ft); total organic content (%); water saturation (%); 30, 90, 120 and/or 180 day gas (DCRGP) and condensate production totals represented as (Mcf/D) and (bbls/D), respectively; and stimulated reservoir volume (SRV).

19. The computer-implemented method of claim 11, wherein the first part of set of measurement or objective data parameters comprises about 80%.

20. The computer-implemented method of claim 11, wherein the data mining comprises using fuzzy pattern recognition.

* * * * *